(12) United States Patent
Murota et al.

(10) Patent No.: US 7,887,031 B2
(45) Date of Patent: Feb. 15, 2011

(54) STAY DAMPER

(75) Inventors: Hiroshi Murota, Tokyo (JP); Takashi Asa, Tokyo (JP); Yasushi Saitou, Sakaki-machi (JP)

(73) Assignee: Kayaba Industry Co., Ltd., Tokyo (JP)

( * ) Notice: Subject to any disclaimer, the term of this patent is extended or adjusted under 35 U.S.C. 154(b) by 724 days.

(21) Appl. No.: 11/510,849

(22) Filed: Aug. 28, 2006

(65) Prior Publication Data

US 2007/0045058 A1 Mar. 1, 2007

(30) Foreign Application Priority Data

Aug. 30, 2005 (JP) .............................. 2005-248655

(51) Int. Cl.
*F15F 5/00* (2006.01)

(52) U.S. Cl. ...................... 267/64.12; 188/69; 188/300

(58) Field of Classification Search .................. 188/69, 188/300, 322.12; 16/82; 267/64.11–64.13
See application file for complete search history.

(56) References Cited

U.S. PATENT DOCUMENTS

| | | | | |
|---|---|---|---|---|
| 3,480,247 A | * | 11/1969 | Waner | 292/275 |
| 4,155,433 A | * | 5/1979 | Porter | 188/300 |
| 4,364,137 A | * | 12/1982 | Hahn | 14/71.3 |
| 4,449,702 A | | 5/1984 | Hasegawa | |
| 4,811,983 A | * | 3/1989 | Watts et al. | 296/190.05 |
| 4,813,100 A | * | 3/1989 | King | 16/49 |
| 4,832,318 A | * | 5/1989 | Wang | 267/120 |
| 5,024,303 A | * | 6/1991 | Kosloff | 188/300 |
| 5,158,268 A | * | 10/1992 | Schnitzius et al. | 267/64.12 |
| 5,331,718 A | * | 7/1994 | Gilbert et al. | 16/82 |
| 5,358,225 A | | 10/1994 | Völpel et al. | |
| 5,575,513 A | | 11/1996 | Tuttle | |

FOREIGN PATENT DOCUMENTS

| | | |
|---|---|---|
| DE | 10311574 A1 | 9/2004 |
| GB | 2365919 A | 2/2002 |
| JP | 10-115340 | 5/1998 |
| JP | 11-201210 | 7/1999 |
| WO | WO-02/055819 A1 | 7/2002 |

\* cited by examiner

*Primary Examiner*—Xuan Lan Nguyen
(74) *Attorney, Agent, or Firm*—Rabin & Berdo, PC

(57) ABSTRACT

A stay damper comprises a cylinder (1) in which a gas is charged, a piston rod (2) which projects under a pressure of the gas in the cylinder (1), and a stopper (10) which locks contraction of the piston rod (2) in an elongated position. The stopper (10) displaces between a lock position which locks contraction of the piston rod (2) and a release position which permits contraction of the piston rod (2) according to directional operation forces applied by an operator. The stopper (10) comprises a restricting member (12, 13) which holds the stopper (10) in the lock position when it is in the lock position and holds the stopper (10) in the release position when it is in the release position. Since the locking operation of the stopper (10) is performed manually, the releasing operation thereof is easily understood by the operator.

4 Claims, 2 Drawing Sheets

STAY DAMPER

FIELD OF THE INVENTION

This invention relates to a stay damper which assists in the opening of a vehicle rear door and support of the door in a fully open sate.

BACKGROUND OF THE INVENTION

With respect to a stay damper which assists in the opening of a swing-type vehicle rear door, JPH10-115340A and JPH11-201210A published in 1998 and 1999 by Japan Patent Office, respectively, propose a locking mechanism which automatically locks contraction of the stay damper from an elongated position.

The stay damper comprises a cylinder, a piston accommodated in the cylinder, and a piston rod connected to the piston and projecting from the cylinder in an axial direction. The base of the cylinder is connected to a vehicle body while the projecting end of the piston rod is connected to the door. The cylinder is charged with gas, and the piston rod is biased to project from the cylinder according to a gas pressure.

The piston rod is covered by a cylindrical cover. The cover is supported by the projecting end of the piston rod such that the cover can overlap the outer circumference of the cylinder and swing about the projecting end of the piston within a limited range.

A leaf spring is interposed between the piston rod and the cover. The leaf spring biases the cover to swing about the projecting end of the piston such that the tip of the cover displaces in a lateral direction.

When the door is closed, the stay damper is in a contracted state in which the piston rod is in the cylinder except for the projecting end thereof and the cover overlaps the outer circumference of the cylinder.

In contrast, when the piston rod is elongated to its maximum length as the door is opened, the cover does not overlap the cylinder any more and the tip of the cover is removed from the outer circumference of the cylinder. In this state, the leaf spring causes the cover to swing about the projecting end of the piston rod, and as a result, the cover is inclined with respect to the cylinder. Thus, the tip of the cover is offset from the cylinder tip in the lateral direction.

When the contracting force is applied to the piston rod, the tip of the cover abuts against the cylinder tip, thereby preventing the piston rod from contracting.

According to the above construction of the stay damper, when the door is fully open, the stay damper is automatically brought into a locked state in which contraction thereof is prevented and thereafter the door is supported in the fully open position by the stay damper.

When the door is to be closed, a lock release operation is required which is accomplished by shifting the tip of the cover from the lock position against the force of the spring in a lateral direction. After performing the lock release operation, the cover no longer interferes with the contracting piston rod and the stay damper contracts smoothly under an appropriate resistance due to the pressure of the gas in the cylinder.

SUMMARY OF THE INVENTION

However, the prior art stay damper which automatically locks in the elongated position has the problem described below.

Specifically, if the operator of the door does not know about the lock release process, the operator may not be able to release the lock of the stay damper in the elongated position, and hence the operator may not be able to close the door. If the operator attempts to forcibly close the door in this state, the stay damper may break.

It is therefore an object of this invention to solve the above problem related to the release of a stay damper from a lock position by a simple construction.

In order to achieve the above object, this invention provides a stay damper comprising a cylinder in which a gas is charged, a piston rod which projects from the cylinder according to a pressure of the gas, and a stopper which locks contraction of the piston rod from an elongated position. The stopper displaces between a lock position which locks contraction of the piston rod and a release position which permits contraction of the piston rod, according to an operation force applied from outside. The stay damper further comprises a restricting member which holds the stopper in the lock position when the stopper is in the lock position and holds the stopper in the release position when the stopper is in the release position such that the stopper displaces only when the operation force is greater than a restriction force of the restriction member.

The details as well as other features and advantages of this invention are set forth in the remainder of the specification and are shown in the accompanying drawings.

DESCRIPTION OF THE PREFERRED EMBODIMENTS

Figure 1:
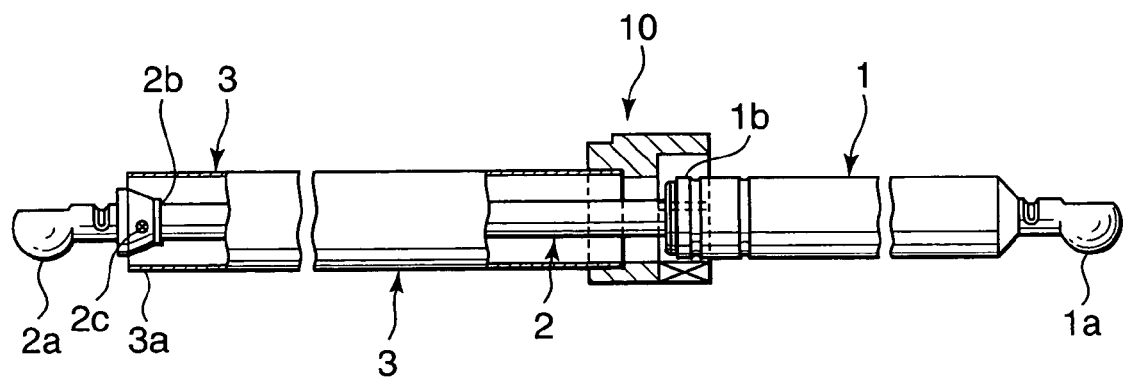
FIG. 1 is a side view of a stay damper according to this invention including a partial longitudinal sectional view of the same.

Referring to FIG. 1 of the drawings, a stay damper interposed between a rear door and a vehicle body of a vehicle comprises a piston rod 2 projecting from a cylinder 1. The cylinder 1 accommodates a piston connected to the piston rod 2 and is charged with a gas which biases the piston so as to cause the piston rod 2 to project from the cylinder 1. The stay damper assists the rear door to open through the piston rod 2 which projects as a result of the expansion pressure of the gas. The rear door is arranged to swing horizontally about a vertical axis.

A ball joint 1a is fixed to a base of the cylinder 1. A ball stud fixed to the vehicle body is fitted in a spherical shaped recess of this ball joint 1a such that the base of the cylinder 1 is connected to the vehicle body and the cylinder 1 is capable of swinging about the ball stud fixed to the vehicle body.

A ball joint 2a is fixed to a projecting end of the piston rod 2. A ball stud fixed to the rear door is fitted in a spherical shaped recess of this ball joint 2a such that the projecting end of the piston rod 2 is connected to the rear door and the piston rod 2 is capable of swinging about the ball stud fixed to the rear door.

The piston rod 2 is covered by a cover 3 having a cylindrical shape. A base 3a of the cover 3 is fitted to the projecting end of the piston rod 2 via a pin 2c. More specifically, the pin 2c penetrates a base 2b of the ball joint 2a and the base 3a of the cover 3 in a lateral direction with respect to the direction of projection of the piston rod 2 such that the cover 3 can swing about the pin 2c, or in other words, such that a tip of the cover 3 can displace in the lateral direction.

A stopper 10 is fixed to the tip of the cover 3.

Figure 2:
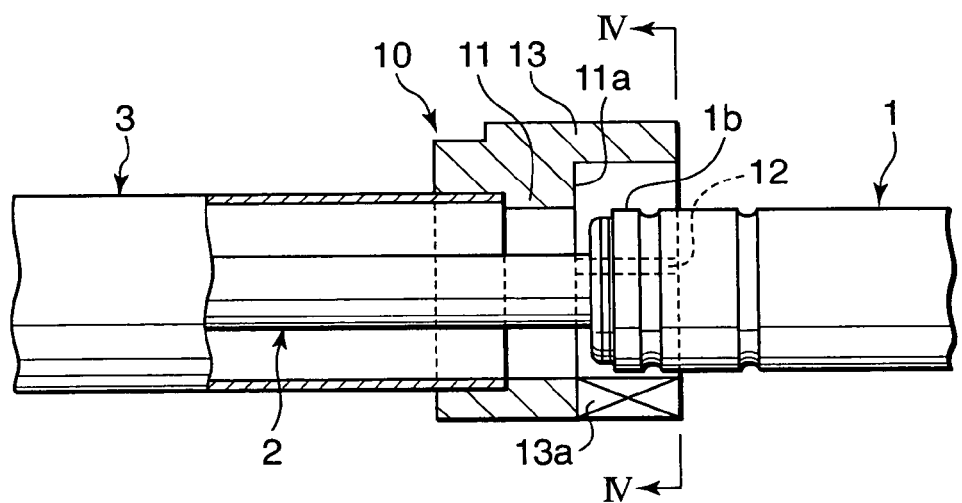
FIG. 2 is an enlarged longitudinal sectional view of a stopper according to this invention.

Referring to FIG. 2, the stopper 10 comprises a cylindrical part 11 which has a substantially identical inner diameter to the cover 3, and a holder 13 having an elongated circular cross-section. The cylindrical part 11 is fixed to the tip of the cover 3. The holder 13 covers a tip 1b of the cylinder 1 when the piston rod 2 is in the most elongated position.

Figure 4:
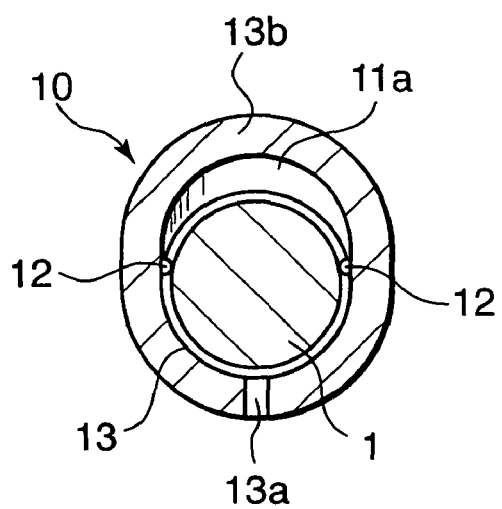
FIG. 4 is a cross-sectional view of the stopper taken along the line IV-IV in FIG. 2.

Referring to FIG. 4, the elongated circular shape corresponds to two semi-circles facing each other and connected by two straight parallel lines. The length of the minor axis of the holder 13 is equal to the inner diameter of the cylindrical part 11. In other words, the shape of the holder 13 corresponds to the shape of the cylindrical part 11 elongated in the swing direction of the cover 3.

Since the cross-sectional shapes of the holder 3 and the cylindrical part 11 are different, a step 11a is formed between the cylindrical part 11 and the holder 3.

On the opposite side of the holder 13 to the continuous part 13b, a gap 13a is formed.

On the inner circumference of the holder 13, a pair of projections 12 are formed inward so as to hold the outer circumference of the tip 1b of the cylinder 1. Each of the projections 12 is in the form of a rib having a length almost equal to the length of the holder 3 in the direction of projection of the piston rod 2. The pair of projections 12 are constructed in positions respectively facing a midpoint along a major axis of the elongated circular cross-section of the holder 3.

Figure 5:
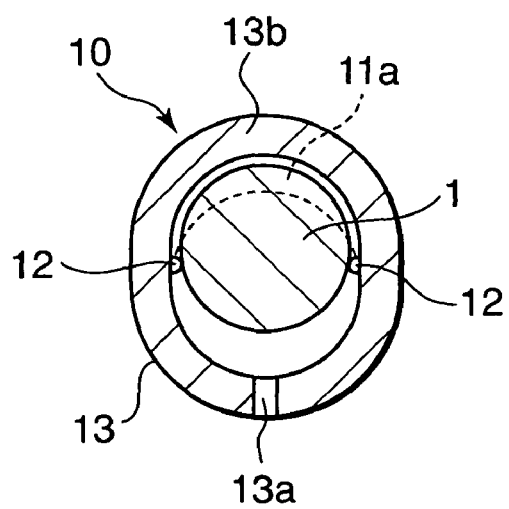
FIG. 5 is a cross-sectional view of the stopper taken along the line V-V in FIG. 3.

According to the above construction, the stopper 10 elastically deforms so as to enlarge the gap 13a when an outward force is applied to the holder 13 from within the inner side thereof. More specifically, in FIG. 4, when a downward force is applied to the stopper 10, the outer circumference of the tip 1b of the cylinder 1 pushes the projections 12 outward so as to enlarge the gap 13a. Due to this outward force exerted on the projections 12, the holder 13 elastically deforms and then displaces downward as shown in FIG. 5.

Figure 3:
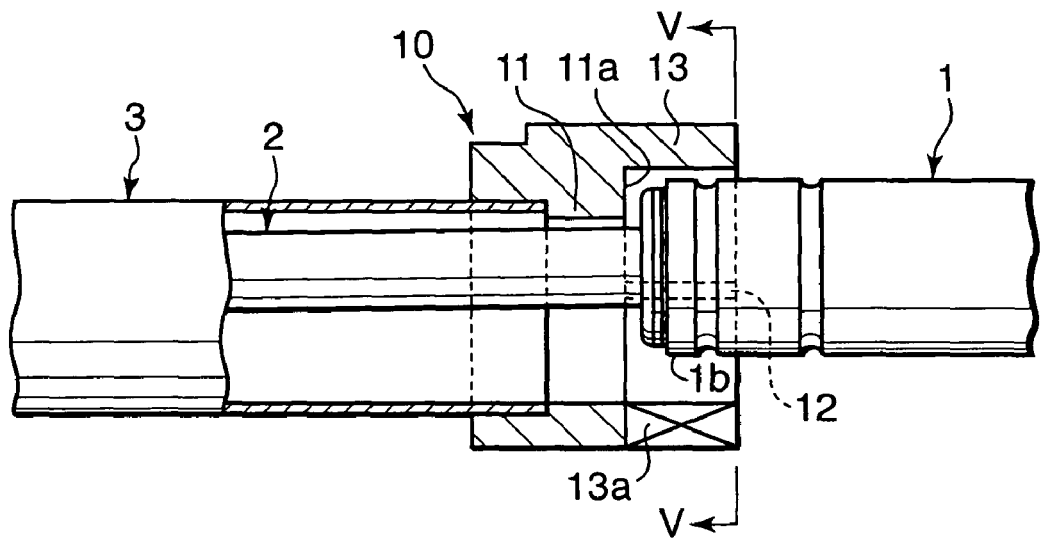
FIG. 3 is similar to FIG. 2 but shows the stopper in a locked state.

Herein, the relative position of the holder 13 and the tip 1a shown in FIGS. 2 and 4 is referred to as a release position of the stopper 10. The relative position of the holder 13 and the tip 1a shown in FIGS. 3 and 5 is referred to as a lock position of the stopper 10. The release position is a position in which the tip 1b is adjacent to the gap 13a, and the lock position is a position in which the tip 1b is adjacent to an opposite part 13b.

When the stopper 10 is in the release position, the piston rod 2 can intrude into the cylinder 1, and when the stopper 10 is in the lock position, intrusion of the piston rod 2 into the cylinder 1 is blocked by the tip 1b which interferes with the step 11a.

The projections 12 function to hold the stopper 10 in both the release and lock positions. When the tip 1b moves in the holder 13 from the release or lock position, it exerts a deforming pressure on the holder 13 via the projections 12 so as to enlarge the gap 13a. The holder 13 exerts a resilient force on the tip 1b via the projections 12 as a reaction force. This reaction force works as a holding force for holding the tip 1b in the release position and the lock position respectively. When the stopper 10 is moved from the release position to the lock position, or vice versa, the tip 1b must push the projections 12 aside so as to move through the space between the projections 12. This tip holding function of the projections 12 is realized by the design of the holder 13.

To ensure that the holder 3 deforms according to an outward force by the tip 1b and exerts a resilient reaction force on the tip 1b, it is necessary to constitute the stopper 10, including the holder 13, by an elastic material. In view of this requirement, the holder 13 is preferably constructed from a resin. For example, the cover 3 is manufactured by injection molding a plastic material and then press fitted onto the outer circumference of the tip of the cover 3.

The stay damper constructed as described above is maintained in a contracted state when the rear door is closed. When an operator operates the rear door to open, gas pressure in the cylinder 1 assists the rear door to open via the piston rod 2.

When the rear door reaches the fully open position, the stay damper reaches the most elongated position as shown in FIG. 1. Here, the holder 13 of the stopper 10 faces the outer circumference of the tip 1b of the cylinder 1 as shown in FIG. 2. The operator of the rear door then applies a downward force on the stopper 10 in FIG. 2. The tip 1b of the cylinder 1 pushes the projections 12 aside and the holder 3 deforms. In this state, the tip 1b of the cylinder 1 moves in the holder 13. The tip 1 and the stopper 10 thus relatively displace from the release position shown in FIG. 4 to the lock position shown in FIG. 5. In the lock position, the tip 1b is held by the projections 12 and displacement of the tip 1b from this position is restricted by the projections 12. In the lock position, the tip 1b interferes with the step 11a of the cylindrical part 11 when the piston rod 2 contracts, thereby locking the contraction of the piston rod 2. Hence, when the operator removes his/her hand from the rear door, the rear door is maintained in the fully open position.

In order to close the rear door in the fully open position, the operator first applies an upward force on the stopper 10 in FIG. 5. According to this operation, the tip 1b of the cylinder 1 again pushes the projections 12 aside so as to move through the space between the projections 12. The tip 1b and the stopper 10 then relatively displace from the lock position to the release position shown in FIG. 4. Once the tip 1b has reached the release position, displacement of the tip 1b therefrom is again restricted by the projections 12. Hence, the operator can remove his/her hand from the stopper 10 while keeping the stay damper in the release position. The piston rod 2 of the stay damper contracts smoothly according to a contraction force exerted by the closing operation of the rear door, performed by the operator.

If the operator did not push the stopper 10 to lock the contraction of the piston rod 2 when the rear door was fully opened, the rear door would not be maintained in the fully open position. When closing the rear door from the fully open position, in contrast, the operator pushes the stopper 10 in the direction opposite to the direction for locking so as to displace the stopper 10 to the release position.

Since the operator of the rear door performs the operation of the stopper 10 when the rear door is open, the operator of the rear door easily understand how to release the stopper 10 when he/she proceeds to close the rear door. This stay damper can, therefore, prevent an unfavorable situation in which the operator cannot close the rear door because the operator does not understand how to release the stopper 10 or in which the stay damper becomes defective due to an attempt to close the door forcibly while the stay damper is locked in the elongated position.

Further, according to this stay damper, since the projections 12 restrict the stopper 10 when it is in the release position as well as when it is in the lock position, the stopper 10 in either position does not move unless another external shifting force is applied, and hence unintended locking or releasing operations of the stopper 10 are prevented. Thus, the stay damper always operates as intended by the operator, and hence the rear door is opened and closed smoothly.

Although the invention has been described above with reference to a certain embodiment, the invention is not limited to the embodiment described above. Modifications and variations of the embodiment described above will occur to those skilled in the art, within the scope of the claims.

For example, in the embodiment described above, the projections 12 are formed in the shape of ribs, but the projections 12 may be formed in a semi-spherical shape. This shape reduces resistance to the relative displacement of the stopper 10 and the tip 1b between the lock and release positions, thereby reducing the operation force required to operate the stopper 10.

In the embodiment described above, unlike the prior art device, a spring is not provided between the piston rod 2 and the cover 3. It is also possible, however, to provide a spring between the piston rod 2 and the cover 3 as long as the resilient force of the spring does not exceed the restriction force of the projections 12, in order to balance the forces required for the locking and releasing operations of the stopper 10 or in order to intentionally differentiate these forces.

In the embodiment described above, the gap 13a is provided in the holder 13 in order to promote elastic deformation of the holder 3, but elastic deformation of the holder 13 can be achieved by other measures such as reducing the wall thickness of the holder 13.

The embodiment describe above focuses on a stay damper for a rear door of a vehicle, but the stay damper according to this invention can also be applied to a hood for an engine room or a trunk lid of a vehicle as well as a vertical swing door of a hatchback style vehicle.

The embodiment of this invention in which an exclusive property or privilege is claimed is defined as follows:

1. A stay damper, comprising:
    a cylinder in which a gas is charged;
    a piston rod which projects from the cylinder according to a pressure of the gas;
    a stopper which locks contraction of the piston rod from an elongated position, the stopper displacing between a lock position which locks the contraction of the piston rod and a release position which permits the contraction of the piston rod, according to an operation force applied from outside;
    a restricting member which holds the stopper in the lock position when the stopper is in the lock position and holds the stopper in the release position when the stopper is in the release position, the stopper displacing only when the operation force is greater than a restriction force of the restriction member; and
    a cover which covers the piston rod and is connected to a projecting end of the piston rod, the cover being free to swing relative to the piston rod, the stopper being fixed to a tip of the cover, and displacing due to the swinging of the cover, according to the operation force applied from outside, between the lock position and the release position, the cover locking the contraction of the piston rod from the elongated position by interfering with the cylinder when in the lock position;
    wherein the stopper comprises a holder having an elongated circular shape cross-section which encloses the cylinder, the holder allowing the cylinder to displace only in a direction along a major axis of the elongated circular shape cross-section and the lock position corresponding to an end of the elongated circular shape while the release position corresponds to another end of the elongated circular shape, and a contact face which interferes with the cylinder to prevent contraction of the piston rod.

2. The stay damper as defined in claim 1, wherein the restricting member comprises a pair of projections formed on the inner circumference of the holder and projecting inward.

3. The stay damper as defined in claim 2, wherein the pair of projections is formed in positions respectively facing a midpoint along the major axis of the elongated circular shape cross-section of the holder.

4. The stay damper as defined in claim 1, wherein a gap is provided in the holder so as to promote an elastic deformation of the holder when an outward force is applied to the holder from the inside thereof.

* * * * *